(12) United States Patent  (10) Patent No.: US 7,802,802 B2
Gordon  (45) Date of Patent: Sep. 28, 2010

(54) CAMERA DOLLY

(75) Inventor: Gary B. Gordon, Saratoga, CA (US)

(73) Assignee: Cambotics Inc., Santa Cruz, CA (US)

( * ) Notice: Subject to any disclaimer, the term of this patent is extended or adjusted under 35 U.S.C. 154(b) by 1567 days.

(21) Appl. No.: 11/060,885

(22) Filed: Feb. 19, 2005

(65) Prior Publication Data

US 2006/0076745 A1  Apr. 13, 2006

Related U.S. Application Data

(60) Provisional application No. 60/618,501, filed on Oct. 12, 2004.

(51) Int. Cl.
B62B 1/00 (2006.01)
(52) U.S. Cl. .................... 280/79.11; 180/252
(58) Field of Classification Search .......... 280/30, 280/47.11, 43.19, 43.2, 47.35, 47.18, 79.11, 280/99; 180/252
See application file for complete search history.

(56) References Cited

U.S. PATENT DOCUMENTS

| 2,719,471 | A | * | 10/1955 | Aspden et al. ............. 396/428 |
| 4,621,562 | A | * | 11/1986 | Carr et al. .................. 89/41.05 |
| 4,736,826 | A | * | 4/1988 | White et al. ............ 191/12.2 A |
| 4,993,912 | A | * | 2/1991 | King et al. ................. 414/729 |
| 5,153,833 | A | * | 10/1992 | Gordon et al. .............. 701/26 |
| 5,155,684 | A | * | 10/1992 | Burke et al. ................. 701/25 |
| 5,350,033 | A | * | 9/1994 | Kraft ......................... 180/167 |
| 5,473,364 | A | * | 12/1995 | Burt ............................. 348/47 |
| 5,671,932 | A | * | 9/1997 | Chapman ................. 280/47.11 |
| 6,191,842 | B1 | | 2/2001 | Navarro |
| 7,611,293 | B2 | * | 11/2009 | Lee et al. .................... 396/428 |

FOREIGN PATENT DOCUMENTS

| EP | 0775664 A2 | 5/1997 |
| GB | 854861 A | 11/1960 |
| GB | 2278907 A | 12/1994 |
| JP | 04271950 A | 9/1992 |
| JP | 2004-17791 A | 1/2004 |

OTHER PUBLICATIONS

Search report dated Feb. 27, 2008 issued by UK Intellectual Property Office in UK counterpart application.

* cited by examiner

*Primary Examiner*—Jeffrey J Restifo
*Assistant Examiner*—Bridget Avery

(57) ABSTRACT

A robotic camera dolly has a column and a base. The base is both driven and steered through the use of two drive wheels. The drive wheels are driven at equal peripheral velocities to move the dolly in a straight line, and at different peripheral velocities to steer the dolly. The base of the dolly rotates during steering. However, a maintaining mechanism maintains the pointing direction of a camera mount despite the rotation of the base. Optionally, the camera dolly additionally has a suspension that couples two caster wheels to its base in a manner that provides a greater compliance with respect to common motion of the caster wheels than with respect to differential motion of the caster wheels. The suspension gives the dolly the rigid stance of a suspension having four points of support, with the stability of a suspension having only three points of support.

13 Claims, 4 Drawing Sheets

CAMERA DOLLY

PRIOR APPLICATION

This application claims benefit under 35 USC §119(e) of U.S. provisional application No. 60/618,501 filed Oct. 12, 2004 of Gary B. Gordon entitled *Robotic Camera Dolly*, the disclosure of which is incorporated herein.

BACKGROUND

Video productions involve a variety of different camera shots and angles. For example, news programs might variously require shots of the whole news set, or the anchors, or side shots for sports or weather. The variety and rapidity of the shots necessitate having several cameras. Historically, each camera was mounted to a manually-operated camera dolly. Each dolly would have an operator, who would set up shots according to short instructions received from the director, such as "camera 2, weatherman". The operator would manually push the dolly around, steering it by turning a horizontal steering wheel that surrounded its column. The steering wheel turned all three of the dolly's wheels in unison, always pointing them in the same direction. This allowed the dolly to be moved about on the studio floor using a "crab" motion, in which the rotational orientation of the dolly remained unchanged. This configuration allowed for very smooth on-air moves, especially when the camera needed to be kept pointing in the same direction.

While this model has worked for decades, nonetheless it is very labor intensive, and as a consequence, studios are increasingly exploring the use of robotic camera dollies. Robotic dollies become especially appropriate for news and other productions where the shots are repetitive from one show to the next. As such, the shots can be set up ahead of time, named, and then recalled during the production by the director's pressing a button, without the need for camera operators.

One robotic camera dolly manufactured by Radamec Incorporated uses an architecture in which servomechanisms are added to dollies that are otherwise essentially manual dollies. That is, the robotic versions substitute a first servomechanism for the steering wheel of a conventional dolly, and substitute a second servomechanism for the operator pushing the conventional dolly. To provide the balanced motive force equivalent to the operator pushing the conventional dolly, a robotic dolly has three driven wheels, as otherwise the dolly will have a tendency to travel in an arc. However, achieving this balance complicates the steering and drive mechanisms, since whatever motive force propels the wheels must now be coupled through whatever steers the wheels. Such coupling is further complicated by the necessity that the wheels must be able to swivel in a full circle. Since the preferred method of navigation is by dead reckoning, that is calculating the position of the dolly by integrating its increments of distances traveled, its ultimate navigational accuracy will be limited by how precisely the dolly can be kept in alignment.

The consequence of small misalignments is that over a period of minutes, such dollies will slowly lose their rotational orientation. Such errors are problematic, since, with their wheels not being able to point in different directions, such dollies have no way to reorient themselves. The only remedy is for an operator to intervene, disconnect the robotics, and manually reorient the dollies.

A different robotic dolly configuration manufactured by Total Spectrum Manufacturing and Vinten Broadcast Limited and disclosed in U.S. Pat. Nos. 5,153,833, 5,008,804, and 4,959,798 overcomes the limitation just described by providing for independent steering of each of its three wheels. Like the Radamec dollies, these dollies also accumulate rotational errors. However, because these dollies are provided with means for independently steering each of their wheels, they are able to steer their wheels into a circle, and drive them sufficiently to rotate the dollies back into their nominal rotational orientation. While by itself this capability is an advantage, the action of swiveling the wheels back and forth against the floor at the same time causes the dolly to move slightly and in an unrepeatable manner. Thus, correcting one error creates yet another error. Further, independent steering makes the wheel mechanisms more complicated. Each wheel mechanism now requires a set of electrical slip rings, an independent steering motor with its own electronics, and an independent drive motor, also with its own electronics.

In summary, television and film studios welcome robotics to the extent that they can reduce costs, reduce absentee problems, and let them offer camera operators more stimulating jobs in the studio. While the best of the present robotic camera dollies perform reasonably well, their complexity makes them overly expensive for widespread adoption. Despite being thirteen years since their first introduction, such dollies manufactured today have done little more than motorize the mechanisms of the older mechanical configurations. A search of the literature, together with a familiarity with the industry, have failed to uncover any art representing an improvement over these complicated designs.

SUMMARY OF THE INVENTION

Embodiments of a camera dolly in accordance with the present invention employ a simplified and more accurate drive and steering mechanism. An exemplary embodiment includes a base, a column extending from the base, a camera mount coupled to the column, and support members for the base that include two spaced-apart drive wheels. The drive wheels are rotated with equal peripheral velocities to move the dolly in a straight line. The drive wheels are rotated at different peripheral velocities to steer the dolly. This method of moving and steering the dolly obviates the need for the drive wheels to be conventionally steerable, i.e., to be capable of rotating about more than one axis of rotation. The drive wheels may also be rotated in opposite directions to rotate the dolly with minimal translation. This allows any accumulated rotational errors to be corrected without manual intervention.

Steering an embodiment of the dolly in accordance with the invention by rotating the drive wheels at different peripheral velocities causes the base to rotate about an axis parallel to the column. To prevent the rotation of the base from changing the pointing direction of the camera mount, and, hence, of a camera mounted on the camera mount, the dolly additionally has a maintaining means for maintaining the pointing direction of the camera mount notwithstanding the rotation of the base. The maintaining means rotates the camera mount equally and oppositely to the rotation of the base to maintain the pointing direction of the camera mount. In one exemplary embodiment, the dolly in accordance with the invention has a conventional pan/tilt head interposed between the column and the camera mount. The pan/tilt head operates as a conventional pan/tilt head and additionally provides part of the structure of the maintaining means.

Some embodiments of the dolly in accordance with the invention incorporate a dual-compliance suspension in accordance with the invention that increases the stability of the dolly. The dual-compliance suspension couples support members to the base in a manner that provides a greater compliance with respect to common motion of the support members than with respect to differential motion of the support members. Typically the support members are caster wheels.

Whenever one caster wheel of the dolly encounters, for example, a rise in the floor, the dual-compliance suspension transfers force from the one caster wheel to the other. The force counteracts the tendency of the dolly to tilt. The suspension also acts to apply a controlled downward force to both caster wheels, so that the caster wheels and the drive wheels maintain firm contact with the floor, and typically equally share the weight of the dolly. Embodiments of the dolly that incorporate the dual-compliance suspension benefit from the enhanced stability of four-point support without suffering the rocking tendency of a rigid four-legged object standing on an uneven floor.

DETAILED DESCRIPTION

Figure 1:
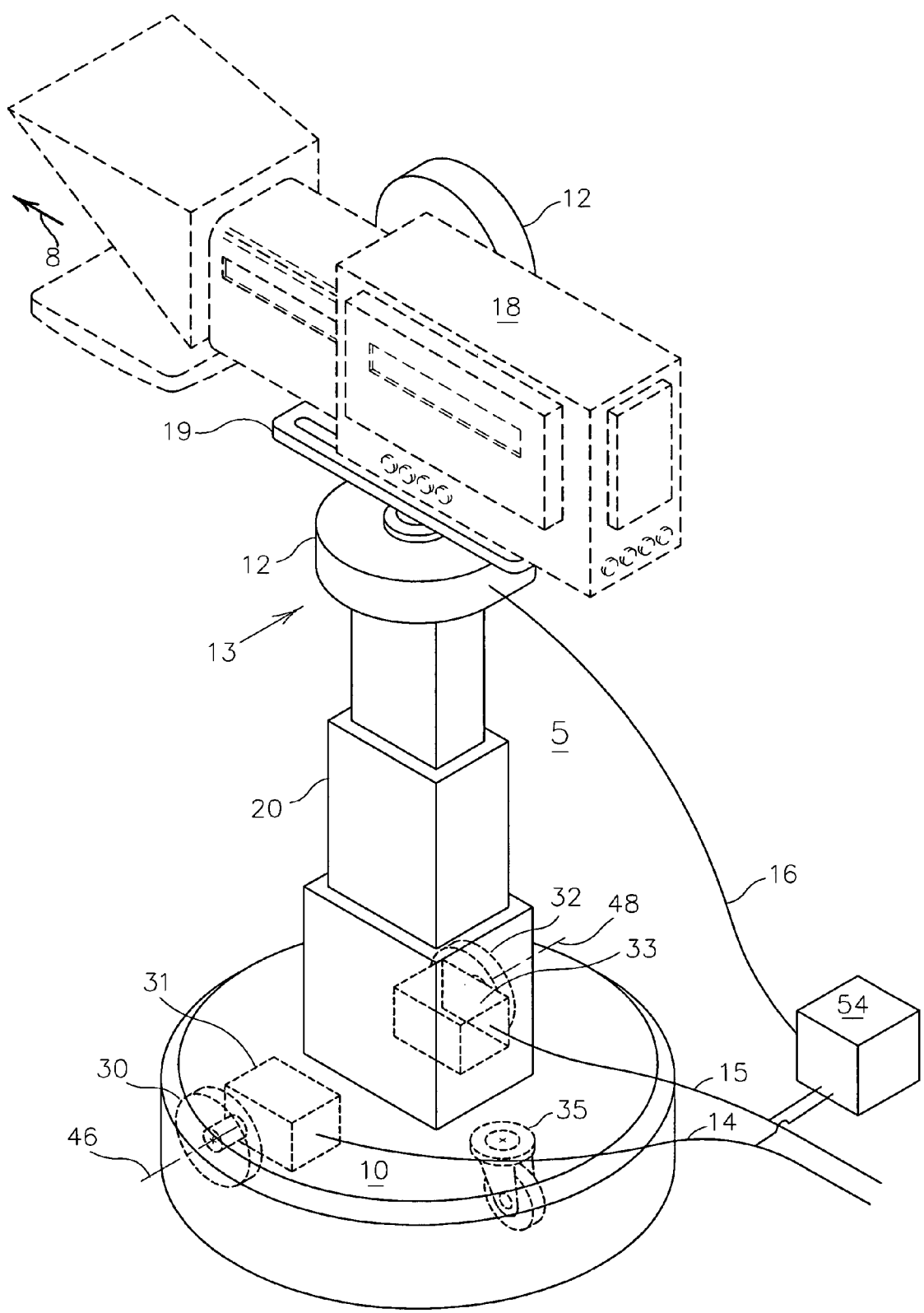
FIG. 1 is an isometric view of an exemplary embodiment of a camera dolly in accordance with the invention.

FIG. 1 shows a first exemplary embodiment 5 of a robotic camera dolly in accordance with the invention. The camera dolly 5 has a base 10 and support members arranged to support the base. In the example shown, the support members include two spaced-apart drive wheels 30,32 and a caster wheel 35 in a tricycle arrangement that stabilizes the camera dolly against tipping. The drive wheels 30,32 are rotated by drive motors 31,33, respectively, and are capable of rotation about no more than one axis of rotation 46,48, respectively. Extending upwards from the base is an elongate column 20, which may be a robotic column. Atop the column 20 is a camera mount 19 coupled thereto by a pan/tilt head 12. The camera mount 19 in turn supports a camera 18, which is typically, but is not limited to, a television camera. Finally, the dolly 5 has maintaining means for maintaining the pointing direction 8 of the camera mount 19, and, hence, the camera 18, despite rotation of the base 10 of the dolly when the dolly is steering.

In the embodiment shown in FIG. 1, a rotating mechanism 13 and a pointing direction controller 54 that provides a pointing direction control signal 16 to the rotating mechanism 13 collectively perform the function of maintaining the pointing direction 8 of the camera mount 19 despite rotation of the base 10. In this embodiment, the pan portion (not independently shown) of the pan/tilt head 12 provides the rotating mechanism 13. References in this disclosure to the pan/tilt head 12 are to be taken to refer to the pan portion of the pan/tilt head 12 unless otherwise stated. In addition to providing the rotating mechanism 13, the robotic pan/tilt head 12 operates as a conventional pan/tilt head in response to conventional pan and tilt control signals (not shown) from a controller (also not shown).

The wheel motors 31,33 that rotate the drive wheels 30,32, respectively, are servomotors. In one embodiment, the wheel motors 31,33 are servomotors of the conventional proportional-integral-differential type. Other types of servomotors may alternatively be used. In one exemplary embodiment, each wheel motor includes a type 54X3 brushless DC motor sold by Penn Engineering, Harleysville, Pa. The DC motor was fitted with an incremental encoder sold by Agilent Technologies, Inc., Palo Alto, Calif.; a model 503 brushless amplifier sold by Copley Controls Corp., Canton, Mass.; and a 64:1-reduction gear box.

The pan/tilt head 12 is typically a conventional pan/tilt head of the type used in the art to control the pointing direction of a camera mount and, hence, of a camera mounted on the camera mount. Such conventional pan/tilt head includes a pan portion and a tilt portion for independently controlling the azimuth and elevation, respectively, of the pointing direction of the camera mount coupled to the pan/tilt head. The pan/tilt head rotates the camera mount about a pan axis and a tilt axis using respective conventional servomechanisms.

To move the dolly 5, a navigation controller (described below with reference to FIG. 3) sends navigation signals 14,15 to the wheel motors 31,33. The navigation controller may be entirely separate from dolly 5, or portions of it may be located in the base 10 or in some other part of the dolly 5. To move the dolly 5 forwards or backwards in a straight line, the navigation controller sends to the wheel motors 31,33 navigation signals 14,15 that cause the wheel motors 31,33 to rotate the drive wheels 30,32 with identical peripheral velocities. The direction of movement is perpendicular to the axes of rotation 46,48 of the drive wheels 30,32, respectively.

In the exemplary embodiment shown in FIG. 1, the drive wheels 30,32 and their drive motors 31,33 are identical. With identical drive wheels 30,32 and identical drive motors 31,33, identical navigation signals 14,15 will cause the drive motors 31,33 to rotate the drive wheels 30,32 with identical angular and peripheral velocities.

To steer the dolly 5, the navigation controller sends to the wheel motors 31,33 navigation signals 14,15 that cause the wheel motors 31,33 to rotate the drive wheels 30,32 with different peripheral velocities. The drive wheels 30,32 rotating with different peripheral velocities cause the base 10 to rotate about an axis parallel to the column 20.

Figure 2:
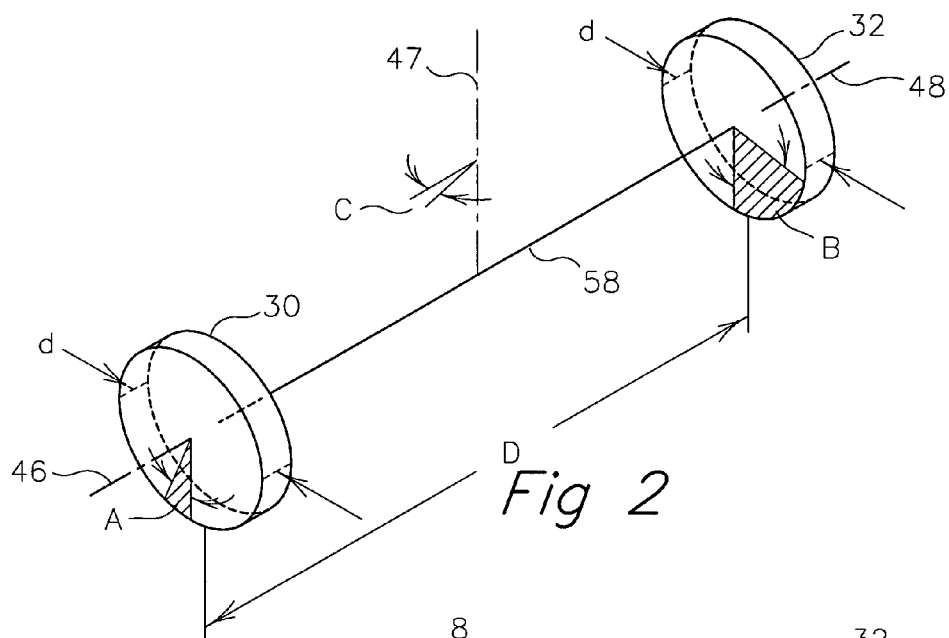
FIG. 2 is a schematic drawing showing a portion of the geometry involved in maintaining the pointing direction of the camera mount of the embodiment of the camera dolly shown in FIG. 1.

FIG. 2 depicts the geometry involved when the navigation signals 14,15 sent from the navigation controller (not shown) to the drive motors 31,33 cause the drive motors to rotate the drive wheels 30,32 with unequal peripheral velocities, which in turn cause the base 10 to rotate. In an example in which the navigation signals 14,15 cause the drive motors 31,33 to rotate the drive wheels 30,32 with equal and opposite peripheral velocities, then the base 10 will rotate about a point midway along a line 58 extending between the centers of the drive wheels 30,32. In another example, such as that shown in FIG. 2, in which the navigation signals 14,15 cause the drive motors 31,33 to rotate the drive wheels 30,32 with different peripheral velocities, the base 10 will both translate and rotate.

In the example shown in FIG. 2, in which the drive wheels 30,32 are of diameter d, and are spaced apart by a distance D, and in which the drive wheel 30 rotates through an angle A and the drive wheel 32 rotates through an angle B, the base 10 rotates though an angle C according to the relationship represented by equation (1):

$$C=(A-B) \times d/D \quad (1)$$

In a numerical example, the drive wheel 30 rotates through an angle A=30 degrees, the drive wheel 32 rotates in the same direction through an angle B=80 degrees, the drive wheels 30,32 are each of diameter d=15 cm and are spaced apart by a distance D=75 cm, the base 10 rotates through an angle of:

$$C=(A-B) \times d/D=(80-30) \times 15/75=10 \text{ degrees}$$

In accordance with the invention, the camera dolly 5 includes maintaining means that prevent the rotation of the base 10 resulting from rotating the drive wheels 30,32 with unequal peripheral velocities from causing an equal rotation of the pointing direction 8 of the camera mount 19 and, hence, of the pointing direction of the camera 18. As noted above, in the example shown in FIG. 1, the pan-tilt head 12 and the pointing direction controller 54 collectively perform the function of the maintaining means.

Figure 3:
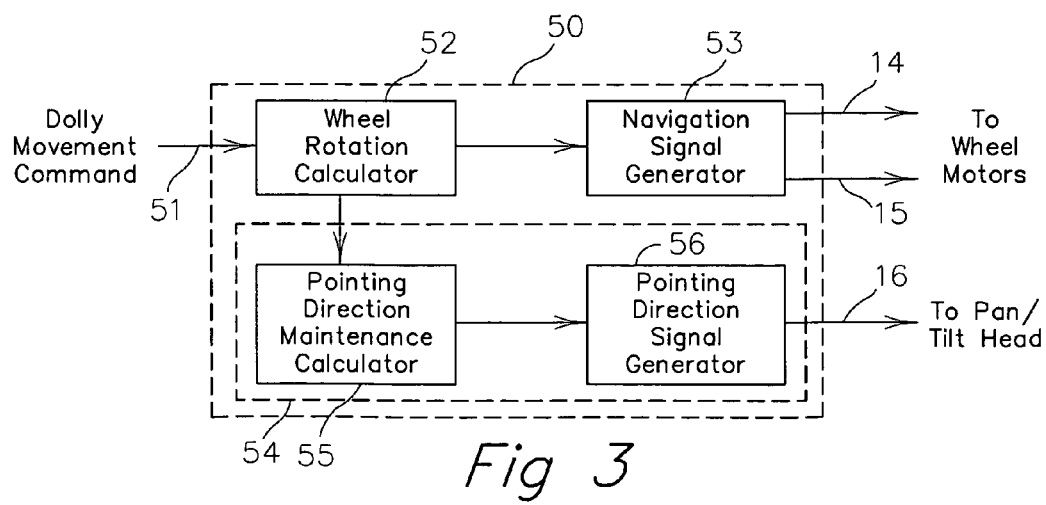
FIG. 3 is a block diagram of an exemplary embodiment of a navigation controller used in connection with maintaining the pointing direction of the camera mount of the embodiment of the camera dolly shown in FIG. 1.

FIG. 3 shows a block diagram of an exemplary embodiment of a navigation controller 50 that incorporates an exemplary embodiment of the pointing direction controller 54. In the example shown, the navigation controller 50 is composed of a wheel rotation calculator 52, a navigation signal generator 53 and the pointing direction controller 54. The pointing direction controller 54 is composed of a pointing direction maintenance calculator 55 and a pointing direction signal generator 56. A source of dolly movement commands (not shown), for example, a joystick, provides a dolly movement command 51 to the navigation controller 50. In the navigation controller 50, the dolly movement command 51 is received by the wheel rotation calculator 52. The wheel rotation calculator 52 computes the rotation of the drive wheels 30,32 needed to cause the dolly 5 to move in accordance with the dolly movement command 51. The wheel rotation calculator 52 provides an output that represents the calculated rotations of the drive wheels 30,32 to the navigation signal generator 53. In response to the output of the wheel rotation calculator 52, the navigation signal generator 53 generates the navigation control signals 14,15 that direct the wheel motors 31,33 to rotate the drive wheels 30,32 in a manner that causes the dolly 5 to move in accordance with the dolly movement command 51.

The wheel rotation calculator 52 additionally provides to the pointing direction controller 54 an output that represents the rotations of the drive wheels 30,32 calculated in response to the dolly movement command 51. In one example, the output provided by the wheel rotation calculator 52 to the navigation signal generator 53 is additionally provided to the pointing direction controller 54. In another example, the wheel rotation calculator 52 provides to the pointing direction controller 54 an output that represents the calculated difference in angular rotation of the drive wheels 30,32.

In the pointing direction controller 54, the pointing direction maintenance calculator 55 receives the output from the wheel rotation calculator 52 and performs a calculation based on equation (1) above to determine the angle of rotation of the base 10 resulting from the rotation of drive wheels 30,32. The pointing direction maintenance calculator 55 generates an output that represents the calculated angle of rotation of the base 10. The output of the pointing direction maintenance calculator 55 is fed to the pointing direction signal generator 56. In response to the output of the pointing direction maintenance calculator, the pointing direction signal generator 56 generates the pointing direction control signal 16 that causes the pan/tilt head 12 to rotate the camera mount 19 in opposition to the base 10 such that the pointing direction 8 of the camera mount 19, and, hence of the camera 18, is maintained relative to the operating environment notwithstanding the rotation of the base 10. Many other configurations of the navigation controller 50 and the pointing direction controller 54 are possible.

To ensure that the pointing direction 8 of the camera mount 19 is smoothly maintained even during the initiation and completion of the rotations of the base 10, the dynamics of the maintaining means are dynamically matched to those of the dolly 5 in some embodiments. Additionally or alternatively, the above-described process for controlling the rotation of the camera mount 19 to compensate for the rotation of the base 10 during steering are performed multiple times in response to each dolly movement command 51. Each performance of the process takes place in a small interval of time. In each such interval of time, the wheel rotation calculator 52 provides an output that represents the calculated rotation of the drive wheels 30,32 during the interval of time; the pointing direction maintenance calculator 55 calculates the resulting rotation of the base 10 during the same interval of time; and the pointing direction signal generator 56 generates the pointing direction control signal 16 that causes the pan/tilt head 12 to rotate the camera mount 19 in opposition to the rotation of the base 10 during the same interval of time. As a result, the pointing direction 8 of the camera mount 19 is maintained relative to the operating environment during the interval of time. Equal intervals of time are typically used. In one example, the duration of each interval of time is of the order of 1 ms. In another example, the duration of each interval of time is of the order of 10 ms.

Alternatively, each interval of time may correspond to a predetermined differential rotation of the drive wheels 30,32.

Although the pointing direction controller 54 is functionally separate from the navigation controller 50, the navigation controller 50 and the pointing direction controller 54 may share common hardware. The pointing direction controller 54 may alternatively operate in response to the navigation signals 14,15, generated by the navigation controller 50 or may operate in response to other signals present in the navigation controller. For example, in some embodiments, the navigation controller 50 generates a rotation signal (not shown) that quantifies the magnitude and direction of the rotation of the base 10 of dolly 5. In this case, an embodiment of the pointing direction controller 54 operates in response to the rotation signal to generate the pointing direction control signal 16 that would cause the pan/tilt head 12 to rotate by the same magnitude and in the opposite direction to the rotation represented by the rotation signal.

As another example, the navigation controller 50 generates strings of incremental movement commands each covering a time interval of, for example, 20 milliseconds to control the movement of the base 10. In this example, the pointing direction controller 54 operates in response to each of the incremental movement commands to generate a corresponding incremental pointing direction control signal 16. In yet another example, the navigation controller 50 generates strings of incremental velocity commands each covering a time interval of, for example, 20 ms to control the movement of the base 10. In this example, the pointing direction controller 54 operates in response to each of the incremental velocity commands to generate a corresponding incremental pointing direction control signal 16.

In the embodiment of the dolly 5 shown in FIG. 1 in which the pan/tilt head 12 constitutes the rotating mechanism 13 of the maintaining means, the pan/tilt head 12 receives not only the pointing-direction control signal 16, but also a conventional pan control signal that controls the conventional operation of the pan portion of the pan/tilt head. More specifically, the pan portion of the pan/tilt head 12 shown in FIG. 1 is responsive to a superposition of the pointing direction control signal 16 and the conventional pan control signal. Consequently, the pointing direction 8 of the camera mount 19 relative to the operating environment is determined solely by the conventional pan control signal and is independent of the orientation of the base 10 of the dolly.

The pointing-direction control signal 16 and the conventional pan control signal may be superposed in the pan/tilt head 12. Alternatively, the superposition may take place in the navigation controller 50 or anywhere else. In an embodiment in which the pointing-direction control signal 16 and the conventional pan control signal are superposed in the navigation controller 50, the pointing direction control signal 16 and the conventional pan control signal are sent together as a single pan command signal to the pan/tilt head 12.

In the example described above with reference to FIG. 3, the pointing-direction control signal 16 is derived from a signal that represents the rotation of the drive wheels 30,32. In other exemplary embodiments, the pointing-direction control signal 16 is derived by detecting the rotational motion of the dolly 5 relative to its operating environment. In an exemplary embodiment, a sensor is mounted to the dolly to detect this rotation. Examples of suitable sensors include a rate gyro, an optical image sensor, and an ultrasonic sensor. The sensor is mounted to the base 10 of the dolly, or to a portion of the dolly that rotates together with the camera mount. The pan/tilt head is an example of the latter. In an embodiment in which the sensor is built into or attached to the pan/tilt head, the sensor operates to maintain the pointing direction of the camera mount 19 by driving the pan/tilt head 12 so that the sensor detects no net rotational movement. In another embodiment, the sensor is substituted for the pointing direction maintenance calculator 55 in the pointing direction controller 54 and the pointing direction controller 54 is mounted on the dolly 5 in a location that rotates as base 10 rotates during steering.

In the exemplary embodiment shown in FIG. 1, the pan/tilt head 12 provides the rotating mechanism 13 that, together with the pointing direction controller 54 perform the function of maintaining the pointing direction 8 of the camera mount 19 despite rotation of the base 10. Alternatively, in accordance with the invention, a rotating mechanism 13 independent of the pan/tilt head 12 may be used in conjunction with the pointing direction controller 54 to maintain the pointing direction 8 of the camera mount 19. The rotating mechanism 13 independent of the pan/tilt head 12 may be located anywhere between the camera mount 19 and the base 10. In various embodiments, the rotating mechanism 13 independent of the pan/tilt head 12 is located between the camera mount 19 and the pan/tilt head 12, between the pan portion and the tilt portion of the pan/tilt head 12, between the pan/tilt head 12 and the top of the column 20, between two lengthways portions of the column 20, between the bottom of the column 20 and the base 10, and between a part of the base 10 to which the support members are coupled and a part of the base 10 from which the column 20 extends.

Figure 4:
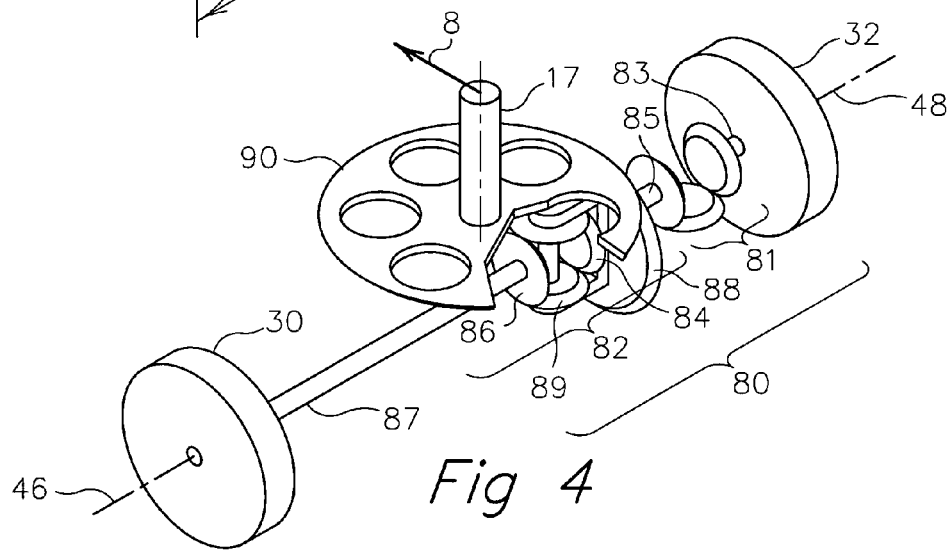
FIG. 4 shows a mechanical embodiment for maintaining the pointing direction of the camera mount in accordance with the invention.

FIG. 4 depicts an entirely mechanical structure 80 that performs the function of maintaining the pointing direction of the camera mount notwithstanding rotation of the base of the dolly. Referring additionally to FIG. 1, the mechanical maintaining means 80 is composed of a direction-reversing gear set 81 and a differential gear set 82 mechanically coupled to the drive wheels 30,32. The mechanical maintaining means mechanically determines the rotation of an output shaft 17 coupled to the camera mount 19. With an appropriate choice of a gear ratio, the rotation of the output shaft 17 will be equal and opposite that of the base 10. As a result, the mechanical maintaining means 80 maintains the pointing direction 8 of the camera mount 19 relative to the operating environment, despite rotation of the base 10.

In mechanical structure 80, a shaft 83 couples the input of the direction-reversing gear set 81 to the drive wheel 32 and a shaft 85 couples the output of the direction-reversing gear set to one differential gear 84 of the differential gear set 82. A shaft 87 couples the drive wheel 30 to the other differential gear 86 of the differential gear set 82. The crown gear 88 of the differential gear set 82 is coupled to the pinions 89 of the differential gear set 82 and meshes with the output gear 90 coupled to the output shaft 17.

The direction-reversing gear set 81 imposes on the shaft 85 a rotation equal and opposite that of the drive wheel 32 coupled to the direction-reversing gear set by the shaft 83. The differential gear set 82 sums the rotation of the drive wheel 30 coupled by the shaft 87, and the reversed rotation of the drive wheel 32 coupled by the shaft 83, the direction-reversing gear set 81 and the shaft 85. The gear sets 81 and 82 collectively function to subtract the rotations of the drive wheels 30,32 and to apply the difference in the rotation to the output shaft 17. In one embodiment, the output shaft 17 is coupled to rotate the entire column 20 of the dolly 5. In another embodiment, the output shaft 17 extends up the column 20 and is coupled at its distal end to the pan/tilt mechanism 12. The gear ratio G between the output gear 90 and the crown gear 88 is determined by the equation G=d/D, where d is the diameter of the drive wheels 30,32, and D is the spacing between them, as shown in FIG. 2. The mechanical maintaining means 80 maintains the pointing direction 8 of the camera mount 19 notwithstanding rotation of the base 10 as the dolly 5 is steered.

Referring again to FIG. 2, the exemplary embodiments described above show the axis of rotation 47 of the base 10 bisecting the line 58 that extends between the centers of the drive wheels 30,32. This geometry permits the base 10 to rotate without the base 10 and the camera mount 19 moving laterally. However, in an embodiment in which the axis 47 intersects, but does not bisect, the line 58, the base 10 can be rotated without moving the camera mount laterally by appropriately scaling the rotations of the drive wheels 30,32.

The exemplary embodiment of the camera dolly depicted in FIG. 1 uses a caster wheel 35 as a third support member to stabilize the dolly 5 against tipping. However, in accordance with the invention, fourth support member can be used to increase the stability of the dolly. An embodiment for use in applications in which the floor on which the dolly 5 is operated is unusually flat has two caster wheels (not shown, but each similar to caster wheel 35) each non-compliantly affixed to the base 10. The caster wheels are located on opposite sides of the line 58 (FIG. 2) that extends between the centers of the drive wheels 30,32. For example, the caster wheels and the drive wheels 30,32 may be located at respective apices of a square or a rhombus.

In an embodiment for use in applications in which the floor on which the dolly 5 is operated is uneven, one of the two caster wheels may be mounted in a way that provides limited compliance in the vertical direction. For example, such caster wheel may be mounted using a mounting (not shown) that provides compliance in the vertical direction with a range of movement of one centimeter. The compliant mounting may comprise a spring that applies to the caster a downward force of one-fourth of the weight of the dolly. Alternatively, one or more of the drive wheels 30,32 and the caster wheels may be fitted with a respective compliant tire.

Figure 5:
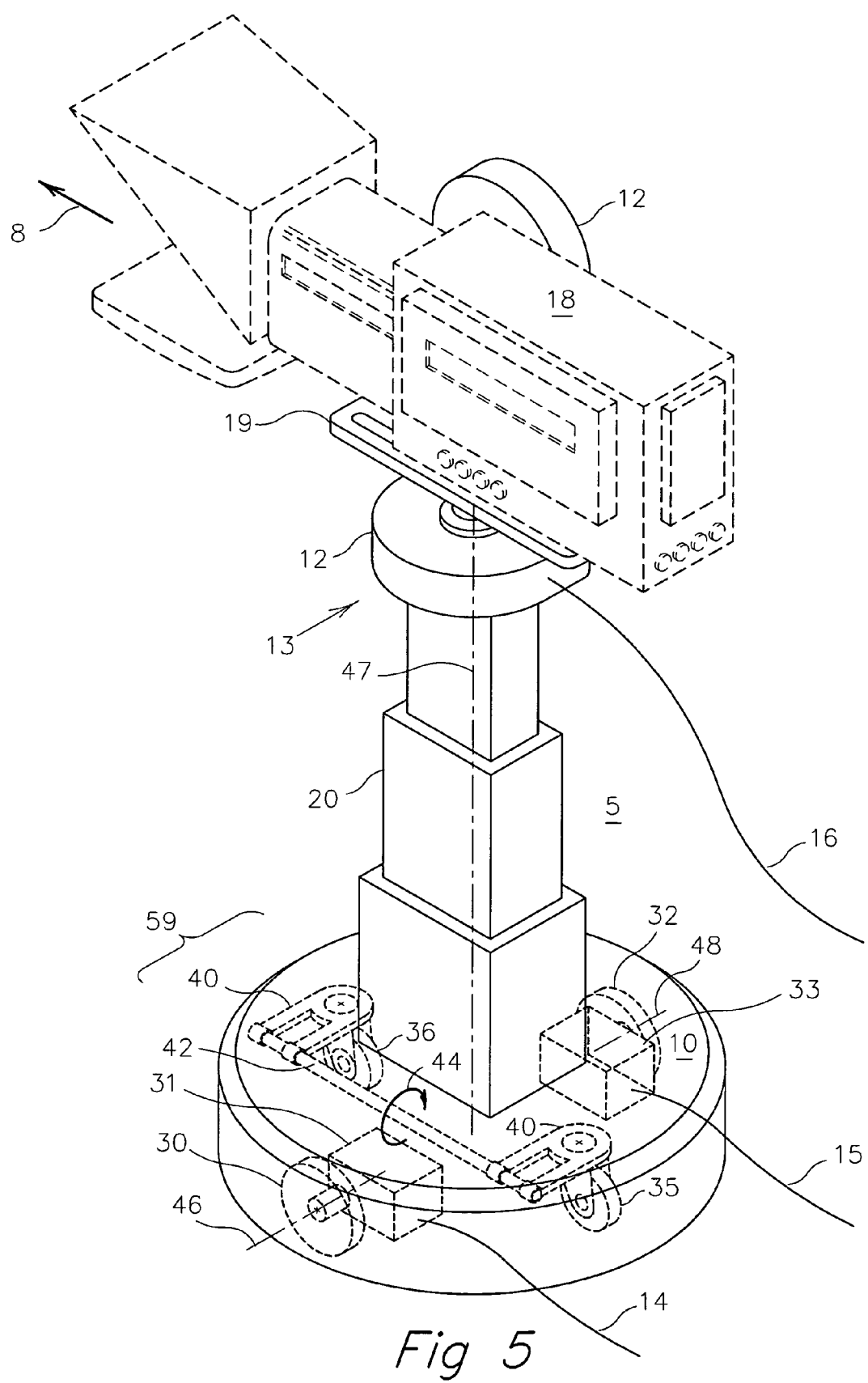
FIG. 5 is an isometric view of an exemplary embodiment of a camera dolly having a first embodiment of a caster-wheel suspension in accordance with the invention.
Figure 6:
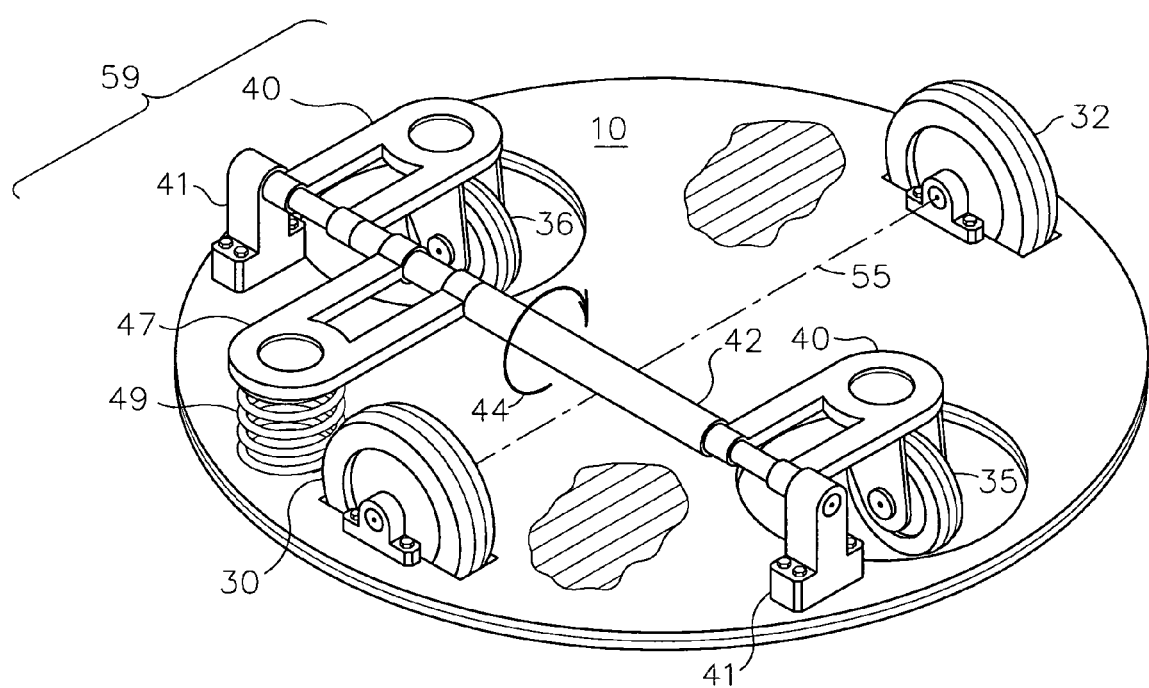
FIG. 6 is an isometric view showing the suspension shown in FIG. 5 in greater detail.

FIG. 5 shows an exemplary embodiment of a camera dolly 5 in accordance with the invention incorporating a first exemplary embodiment of a dual-compliance suspension 59. FIG. 6 shows the suspension 59 in more detail. Elements of the embodiment shown in FIGS. 5 and 6 that correspond to elements of the embodiment shown in FIG. 1 are indicated by the same reference numerals and will not be described again here. The suspension 59 provides increased stability of the dolly 5 on uneven floors. The suspension 59 locates two caster wheels 35,36 equidistant from, and on opposite sides of, the line 58 that extends between the centers of the drive wheels 30,32 so that the wheels 30,32 and the caster wheels 35,36 are located at respective apices of a square or a rhombus.

The suspension 59 is composed of wheel mounts 40, bearings 41, a coupling bar 42, a lever arm 47 and a spring 49 and mechanically couples the vertical motions of the caster wheels 35,36. Each caster wheel 35,36 is non-compliantly attached to a respective wheel mount 40. The wheel mounts 40 extend laterally from the coupling bar 42 and are non-compliantly attached to the coupling bar 42 adjacent opposite ends thereof. The bearings 41 are pillow-block bearings and attach the coupling bar 42 to the base 10. FIG. 6 shows the bearings 41 located outboard of the wheel mounts 40, but the order of the bearings 41 and the wheel mounts 40 on the coupling bar 42 may be reversed. The lever arm 47 is connected to the coupling bar 42 and extends laterally from the coupling bar in a direction opposite to the extension direction of the wheel mounts 40. The spring 49 is a compression spring and is interposed between the base 10 and the end of the lever arm 47 remote from the coupling bar 42. The spring 49 and the lever arm 47 collectively apply torque 44 to the coupling bar 42. The coupling bar 42 and the wheel mounts 40 translate the torque into a downward force on each caster wheel 35,36. Spring 49 may alternatively be a tension spring, in which case, the lever arm 47 extends from the coupling bar 42 in the same direction as the wheel mounts 40. Other mechanisms may be used instead of the lever arm 47 and the spring 49 to apply torque 44 to the coupling bar 42.

In operation, the coupling bar 42, the non-compliant attachments of the caster wheels 35,36 to the wheel mounts 40 and non-compliant attachments of the wheel mounts 40 to the coupling bar 42 collectively couple the vertical motions of the caster wheels 35,36. In the exemplary embodiment shown in FIGS. 5 and 6, the lateral extensions of the wheel mounts 40 from the coupling bar 42 are equal so that the vertical motions of the caster wheels 35,36 are also equal. The spring constant of the spring 49 is typically chosen to make the suspension 59 exert a downwards force on each caster wheel 35,36 approximately equal to the downward force on each drive wheel 30,32. For example, in an embodiment in which the loaded dolly 5 weighs 200 kg, the spring constant of the spring 49 is chosen such that the suspension 59 exerts a downward force on each caster wheel 35,36 of approximately 50 kg. The downward force, i.e., weight, on each drive wheel 30,32 is also approximately 50 kg.

The coupling between the caster wheels 35,36 provided by the coupling bar 42 causes the caster wheels 35,36 to move vertically in unison and provides the suspension 59 with a relatively small compliance with respect to differential motion of the caster wheels. The suspension 59 typically does not allow caster wheels 35,36 to move vertically independently of each other. However, the suspension 59 allows the caster wheels 35,36 to move freely in unison. With respect to movement of the castors 35,36 in unison, the suspension 59 has a relatively large compliance defined by the spring factor of the spring 49 and the extensions of the wheel mounts 40 and the lever arm 47 from the coupling bar 42. Accordingly, the suspension 59 has a relatively large compliance with respect to common motion of the caster wheels. These properties of the suspension 59 in accordance with the invention differ from those of a conventional suspension in which both caster wheels are non-compliantly attached to the base. The compliances of the conventional suspension with respect to common motion and differential motion of the caster wheels are the same, and are both low. The above-described properties of the suspension 59 also differ from those of a conventional suspension in which both caster wheels are compliantly attached to the base. The compliances of the conventional suspension with respect to common motion and differential motion of the caster wheels are again the same, but in this case, are large.

Operation of the suspension 59 will be described with reference to an example in which embodiments of the dolly 5 incorporating different suspensions encounter a 10 mm-high local hill in the floor. The hill causes an embodiment of the dolly 5 having two drive wheels 30,32, and a conventional suspension having a forward, non-compliantly mounted caster and a rearward, compliantly-mounted caster, to tilt backwards about the drive wheels 30,32. The resulting height difference between a location on the base over the forward caster and a location on the base over the rearward caster is 20 mm, i.e., twice the height of the hill. In an embodiment in which the spacing between the forward and rearward casters is 1 m, the 10 mm-high hill would cause the dolly 5 to tilt backwards through an angle of 1.15 degrees.

In an embodiment of the dolly 5 incorporating an embodiment of the suspension 59 in accordance with the invention in which the caster 36 is a forward caster and the caster 35 is a rearward caster, the forward caster 36, on encountering the hill, has a tendency to recede into the dolly base by 10 mm. However, the suspension 59 prevents recession of the forward caster 36 by the full 10 mm by coupling the motion of the forward caster 36 to the rearward caster 35. As a result, each caster wheel 35,36 recedes into the base by only 5 mm. With each caster receding into the base by only 5 mm, the resulting height difference between a location on the base over the forward caster 36 and a location on the base over the rearward caster 35 is only 10 mm instead of 20 mm, and the tilt of the above-described example of the dolly 5 is reduced to 0.57 degrees.

The suspension 59 in accordance with the invention provides the stiffness of a suspension having four widely-spaced points of support without the instability that such four-point suspension would have if it were rigid and were resting upon an uneven floor. The suspension 59 has a stiffness four times that of an otherwise similar conventional suspension in which one of the caster wheels is non-compliantly mounted and the other of the caster wheels is compliantly mounted. The greater stiffness of the suspension 59 results from its points of firm support being twice as far apart as those of a similar conventional suspension. In the suspension 59, the points of firm support are separated by the distance between the caster wheels 35,36. In the conventional suspension, the points of firm support are separated by the distance between one caster wheel 36 and the line 58 that extends between the centers of the drive wheels 30,32. Because the distance between the points of firm support is twice as great in the suspension 59, a given tipping force is resisted by applying half the force at each point of firm support. When half the force acts over twice the distance, the stiffness against rocking improves fourfold. To summarize, an embodiment of the dolly 5 incorporating the dual-compliance suspension 59 in accordance with the invention, despite having four wheels, does not rock on uneven floors. Moreover, the dolly incorporating the suspension 59 tilts less and has greater rigidity than a dolly having a conventional suspension.

The embodiment of the suspension shown in FIGS. 5 and 6 can have many variations in accordance with the invention. For example, while a coil spring 49 is shown applying torque 44 to the coupling bar 42, torque may alternatively be applied by any other method such as by using a torsion spring coupled to the base 10 and to the coupling bar 42 at its ends. In another example, torque is applied by a coil spring located coaxially with the coupling bar 42 with one end coupled to the base 10 and the other end coupled to the coupling bar 42. Further, while the exemplary embodiment of the suspension 59 is shown in FIG. 6 with the caster wheel mounts 40 structured as lever arms rigidly attached to the coupling bar 42, other types of wheel mounts may be used in accordance with the invention. The wheel mounts may have any structure that translates between motion relative to the base of the caster wheel mounted thereon and rotation of the coupling bar 42. Such a wheel mount may additionally be structured to move the caster wheel truly vertically, for example, instead of in an arc as in the example shown.

Figure 7:
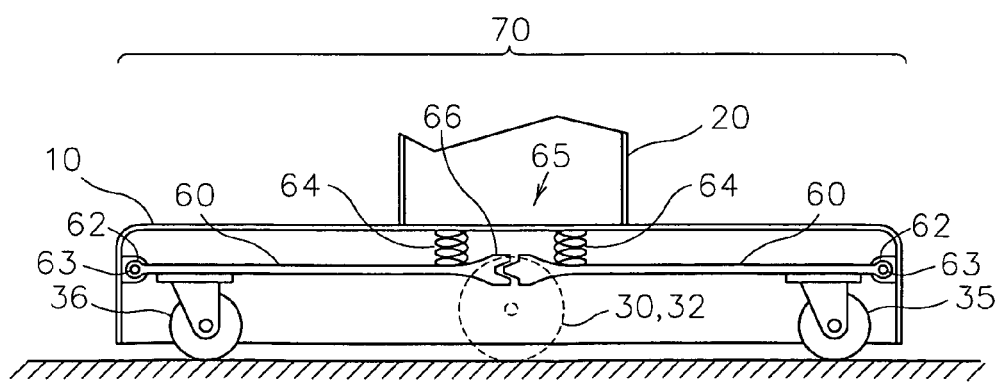
FIG. 7 is a cut-away side view of a second exemplary embodiment of a caster-wheel suspension in accordance with the invention.

FIG. 7 shows a second exemplary embodiment 70 of a dual-compliance suspension in accordance with the invention. The suspension 70 is composed of two elongate mounting bars 60, pivots 63 and springs 64. Each mounting bar 60 is coupled adjacent its distal end 62 to the base 10 by a respective one of the pivots 63. The mounting bars 60 are linked at their proximal ends by a linking structure 65 that couples the vertical motions of the proximal end of one mounting bar 60 to the proximal end of the other mounting bar 60, and vice versa. In the example shown, gear teeth 66 are formed in the proximal end of each mounting bar 60. The gear teeth 66 of the mounting bars 60 engage with one another to provide the linking structure 65. A caster wheel 35,36 is non-compliantly mounted to each of the mounting bars 60 adjacent the distal end 62 thereof. A compression spring 64 is located between the base 10 and either or both of the mounting bars 60 to apply a downward force to the respective mounting bar. In an embodiment having a spring 64 between the base 10 and only one of the mounting bars 60, the downward force exerted by the spring is applied to the other mounting bar 60 by the linking structure 65.

In the suspension 70, the downward force applied by the spring 64 is transferred to each of the caster wheels 35,36 by the mounting bars 60 acting as levers. The mounting bars 60 and the linking structure 65 collectively coordinate the vertical motions of the caster wheels 35,36. The suspension 70 prevents the caster wheels 35, 36 from moving vertically independently of one another, since the mounting bars 60 transfer any vertical motion by one caster wheel to the other caster wheel, and impose an identical vertical motion on the other caster wheel. Since the suspension 70 constrains the vertical motions of the caster wheels 35,36 to be identical, the suspension 70 has a small compliance with respect to differential motion of the caster wheels 35,36. On the other hand, the suspension 70 allows the caster wheels 35,36 to move together vertically, with a compliance provided by the spring 64, and therefore has a relatively large compliance with respect to common motion of the caster wheels 35,36. Thus, the dual-compliance suspension 70 has compliances similar to the suspension 59 described above with reference to FIGS. 5 and 6 with respect to common motion and differential motion of the caster wheels 35,36.

The embodiment of the suspension 70 shown in FIG. 7 has the caster wheels 35,36 located adjacent the distal end 62 of each mounting bar 60 inboard of the pivots 63. However, the caster wheels 35,36 could alternatively be located adjacent the distal end 62 of each mounting bar 60 outboard of the pivots 63. This would increase the distance between the caster wheels 35,36 obtainable within a base 10 of given dimensions, which would further increase the stability of the suspension 70. Regardless of whether the caster wheels 35,36 are located inboard or outboard of the pivots 63, the caster wheels 35,36 are mounted closer to the distal ends 62 of the mounting bars 60 than to the proximal ends thereof to increase stability.

While several exemplary embodiments are described above, many variations are possible and within the scope of the invention. For example, the drive wheels 30,32 do not need to be of the same diameter. To reasonably deter the wheels from scrubbing against the floor during turns, however, the wheel axes 46,48 are located in vertical planes separated by less than ten centimeters, and optimally within the same vertical plane.

While mounting the drive wheels 30,32 to the base 10 in a manner that allows each of them to rotate about no more than one axis of rotation is an economical configuration, the drive wheels 30,32 could be alternatively be mounted in a manner that provides an additional axis of rotation. For example, an embodiment of a dolly incorporating a suspension 59 or 70 in accordance with the invention in which the caster wheels have a greater compliance with respect to common motion than with respect to differential motion, the drive wheel could be provided with an additional axis of rotation that allows its drive wheels to be pivoted about such additional axis of rotation. The drive wheels can be steered in unison in new directions, allowing the dolly to move in a crab-like manner.

The caster wheels 35,36 are shown in FIGS. 5-7 spaced at equal distances from the line 58 extending between the centers of the drive wheels 30,32. This shares the weight of the dolly equally between the caster wheels 35,36. Moreover, the FIGS. 5-7 show examples of suspensions in which the caster wheels 35,36 move vertically in unison. However, other tradeoffs are possible in accordance with the invention. For example, the caster wheels 35,36 may be placed at different distances from the line 58, and may optionally be coupled such that they move in the same direction but by different amounts. Such configurations are understood to be within the scope of the present invention, in which the caster wheels have a greater compliance with respect to common motion than they do with respect to differential motion.

The embodiments of the dual-compliance suspension in accordance with the invention described above with reference to FIGS. 5-7 are described above with reference to their use to support the exemplary camera dolly shown in FIG. 5. The camera dolly shown in FIG. 5 is steered by rotating its drive wheels at different peripheral velocities as described above. However, embodiments of the dual-compliance suspension in accordance with the invention may equally well be used to support a camera dolly steered by a conventional steering mechanism (not shown).

This disclosure describes the invention in detail using illustrative embodiments. However it is to be understood that the invention defined by the appended claims is not limited to the embodiments described.

I claim:

1. A camera dolly, comprising:
a base;
an elongate column extending from the base;
a camera mount coupled to the column;

support members arranged to support the base, the support members comprising two spaced-apart drive wheels each rotatable about no more than one respective axis of rotation;

a wheel motor coupled to each of the drive wheels, the wheel motors operable to rotate the drive wheels at equal peripheral velocities to move the dolly in a straight line, and operable to rotate the drive wheels at different peripheral velocities to steer the dolly, the steering causing the base to rotate about an axis parallel to the column; and maintaining means, coupled to the column, for maintaining a pointing direction of the camera mount notwithstanding the rotation of the base during the steering.

2. The camera dolly of claim 1, in which the maintaining means comprises a rotating mechanism coupled to rotate the camera mount relative to the base.

3. The camera dolly of claim 1, in which the maintaining means comprises a differential gear set, the differential gear set comprising:
   - a first input mechanically coupled to the periphery of one of the drive wheels
   - a second input mechanically coupled to the periphery of the other of the drive wheels by a direction-reversing gear set; and
   - an output shaft mechanically coupled to rotate the camera mount.

4. The camera dolly of claim 1, in which:
the camera dolly is operable in an operating environment; and
the maintaining means comprises:
   a sensor operable to detect orientation relative to the operating environment, and
   a rotating mechanism coupled to rotate the camera mount in response to the sensor.

5. The camera dolly of claim 1, in which the support members additionally comprise a caster wheel.

6. The camera dolly of claim 1, in which the support members additionally comprise two caster wheels.

7. The camera dolly of claim 1, in which:
during the steering, the base rotates about an axis of rotation; and
the camera mount is centered on the axis of rotation.

8. The camera dolly of claim 2, additionally comprising a navigation controller electrically connected to the wheel motors and the rotating mechanism to provide respective control signals thereto, the navigation controller comprising a pointing direction maintenance calculator that calculates the rotation of the base due to the steering and, in response to the calculated rotation, generates a control signal for the rotating mechanism.

9. The camera dolly of claim 2, in which the rotating mechanism is coupled to rotate the column relative to the base.

10. The camera dolly of claim 2, in which the rotating mechanism is coupled to rotate the camera mount relative to the column.

11. The camera dolly of claim 3, in which the output shaft is mechanically coupled to rotate the column.

12. The camera dolly of claim 6, in which the caster wheels are located on opposite sides of a line extending between the centers of the drive wheels.

13. The camera dolly of claim 6, in which one of the caster wheels is compliantly mounted.

\* \* \* \* \*